US00RE36235E

United States Patent [19]

Keller et al.

[11] E Patent Number: Re. 36,235

[45] Reissued Date of Patent: Jun. 29, 1999

[54] DISPENSING AND MIXING APPARATUS

[75] Inventors: Wilhelm A. Keller, Huenenberg, Switzerland; Sung Jen Chen, Andover, Mass.

[73] Assignee: Wilhelm Keller, Rotkreuz, Switzerland

[21] Appl. No.: 07/892,687

[22] Filed: May 27, 1992

Related U.S. Patent Documents

Reissue of:

[64] Patent No.: 4,767,026
Issued: Aug. 30, 1988
Appl. No.: 07/004,061
Filed: Jan. 16, 1987

U.S. Applications:

[63] Continuation of application No. 07/574,838, Aug. 29, 1990, abandoned.

[51] Int. Cl.[6] ..... B67D 5/52

[52] U.S. Cl. ..... 222/137; 222/145.6; 366/339

[58] Field of Search ..... 222/135, 136, 222/137, 145, 459, 145.6; 366/336–340; 206/219, 384; 285/396, 361, 402

[56] References Cited

U.S. PATENT DOCUMENTS

| | | | |
|---|---|---|---|
| 3,159,312 | 12/1964 | Van Sciver, II | 222/137 X |
| 3,390,814 | 7/1968 | Creighton, Jr. et al. | 222/145 X |
| 3,575,319 | 4/1971 | Safianoff | 222/145 X |
| 3,767,085 | 10/1973 | Cannon et al. | 222/145 X |
| 4,452,285 | 6/1984 | Leibhard et al. | 222/136 X |
| 4,538,920 | 9/1985 | Drake | 222/145 X |
| 4,690,306 | 9/1987 | Stäheli | 222/137 X |

*Primary Examiner*—Kevin P. Shaver

*Attorney, Agent, or Firm*—McAulay Fisher Nissen Goldberg & Kiel, LLP

[57] ABSTRACT

A dispensing device and disposable mixer for a plurality of fluids is provided in a combination in which the dispenser stores the fluids separately and delivers them to an orifice in which the fluids are maintained in separation to the point of interface between the orifice and the disposable mixer with [means] *an arrangement* in the inlet end of the mixer having low resistance to the flow of the fluids for preventing cross contamination between the fluids and optionally provided with [means] *an arrangement* at the inlet end of the mixer for both enhancing the mixing action downstream and for maintaining the integrity and separation between the fluids.

25 Claims, 1 Drawing Sheet

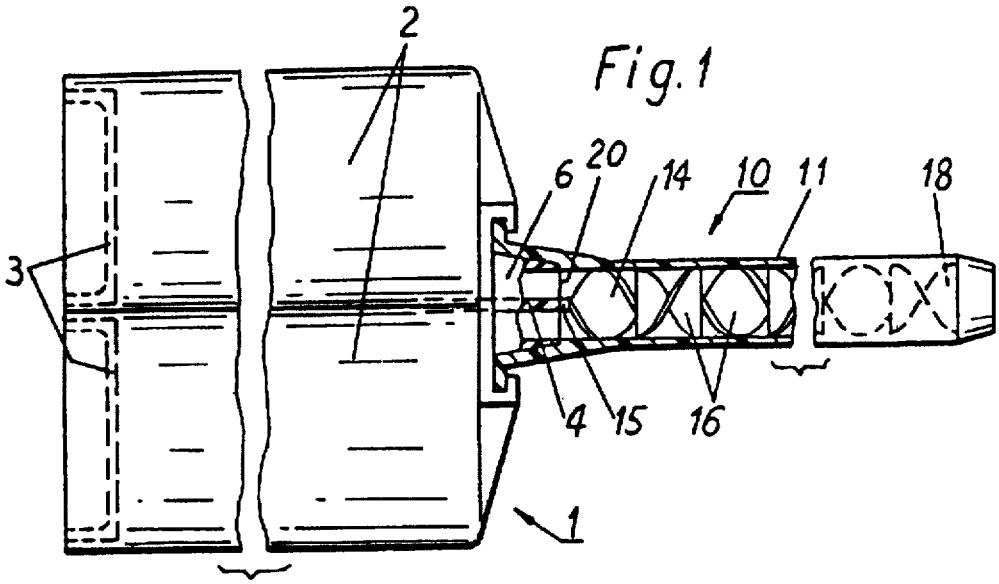
Fig. 1
Fig. 2
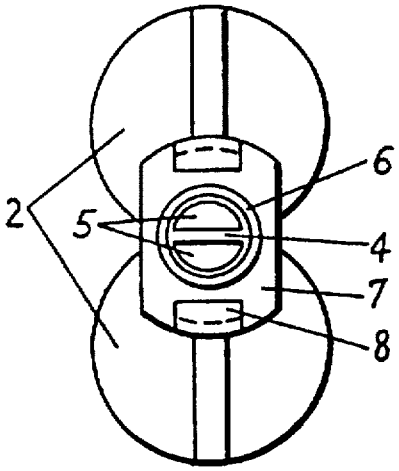
Fig. 3
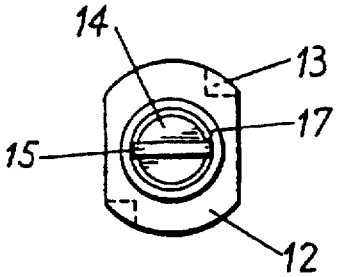
Fig. 4a
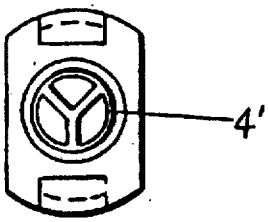
Fig. 4b
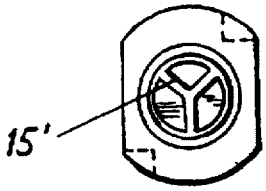

DISPENSING AND MIXING APPARATUS

Matter enclosed in heavy brackets [ ] appears in the original patent but forms no part of this reissue specification; matter printed in italics indicates the additions made by reissue.

*This is a continuation of Ser. No. 07/575,838, filed Aug. 29, 1990, now abandoned, which is a reissue of U.S. Pat. No. 4,767,026, issued Aug. 30, 1986.*

FIELD OF THE INVENTION

This invention relates to dispensing devices and more particularly to a combination of a dispensing device and a disposable mixing device employing stationary mixing elements for use therewith. Still more particularly, it relates to the combination of a dispensing device and a disposable mixer with means for both preserving the integrity of and preventing contamination between two or more fluids being dispensed, and for maximizing the mixing of the fluids with a minimum of pressure drop along the axis of the mixing device.

BACKGROUND OF THE INVENTION

Dispensing devices of this general type, as is well known in the art, are useful in the application of a variety of pasty or highly viscous products such as adhesives, joint filler agents, foams, sealants, molding compounds etc., whereas the products consist of two or more components to be stored separately, before use to be mixed however in order to start a chemical reaction between them, usually causing a solidification or hardening of the mass. In using the device, the content of the cartridge is pressed out of each barrel by actuation of a delivery plunger, the components flowing from the orifice into and through the attached mixer unit where they become closely intermixed. Usually the content of a cartridge is dispensed intermittently in several portions, whereas the components joined within the mixer will steadily react during the idle intervals. If the intervals are long enough, the mixer will become inoperable and will have to be replaced. This is due to the fact that the components will cure at the interface between the cartridge and the mixer and, due to diffusion, this curing will extend back in to the cartridge. This may hinder the detachment of the mixer (ordinarily left on the cartridge), but even worse, solidified particles or "clods" formed in the mass will block the further dispensing of the cartridge content and will cause defective application, such as rippled surface on articles, faulty joints, etc.

It is an object of the invention to eliminate these drawbacks and to afford unimpeded delivery of the cartridge content and faultless application thereof upon repeated replacement of the mixer unit and after extended time intervalsbetween partial deliveries.

Dispersing and mixing combinations have been known in which fluids to be mixed have been dispensed by double barrelled syringe or caulking gun type dispensers (see e.g. U.S. Pat. Nos. [3,309,814, 4,041,463] *3,390,814, 4,014,463,* and 4,538,920). These prior devices are included among those described above and have several specific drawbacks. The '814 patent employs a moving mixing element and it leaves the two fluids to be mixed in close juxtaposition at the delivery point of the syringe, and hence subject to cross-contamination. In addition, the mixer was not conveniently disposable, and leaves the orifice of the dispenser subject to contamination by admixture of the two fluids. The '463 patent discloses a disposable mixing device for use with a two barrelled dispenser and a baffle which extends into the mixer. Contamination between the two fluids at the orifice of the dispenser is avoided by a rubber seal. The '920 patent discloses a disposable mixing tube secured to a double barrelled syringe type dispenser in which a premix chamber is used to split each of the separate streams prior to their reaching the mixing elements. The disadvantages of this type of premixing are that it introduces a substantial pressure drop in the mixing line and does not cooperatively contribute to the mixing action of the stationary mixing elements further downstream.

The objects of this invention are to overcome some or all of the disadvantages of the prior art. More particularly, it is an object to provide a dispenser and disposable mixer combination in which cross-contamination between a plurality of fluids is avoided at the orifice end of a multibarrelled dispenser without substantial pressure loss. Still another object is to accomplish the foregoing objectives and at the same time direct the moving streams in such a way as to enhance the mixing action of the stationary mixing elements downstream.

BRIEF DESCRIPTION OF THE INVENTION

In the accomplishment of these and other objects of the invention, in a preferred embodiment thereof, a two-component dispensing device is employed comprising a twin-barreled dispensing cartridge, with two dispensing channels separate by a partition wall and each of the barrels leading into a common orifice in which a baffle separates the two streams and terminates at its downstream end with a transverse radially extending end, and further comprising a static mixer unit releasably attached to said orifice, said mixer unit having a plurality of mixing vanes stacked in succession with alternating right-hand and left-hand twist and fixed in alternately offset rotary position within a mixing tube.

A feature of the invention is that a ribbon-like separating element is used in the mixing tube with its upstream end in abuttment with the downstream end of the orifice baffle and its downstream end in abuttment and at right angles to the next mixing element downstream.

A further feature is that the connection between the mixing tube is arranged so that when it is fully connected to the dispenser there is a substantial residual spring compression between the separation element and the end of the baffle.

Still another feature is that the separating means is arranged to direct the fluids in a helical path, and the mixing element next downstream is arranged at right angles to the separation means and to reverse the direction of the helical path to maximize the mixing action between the separation element and the mixer.

Additional features are the simplicity and ease of manufacture.

DESCRIPTION OF THE DRAWINGS

A preferred embodiment of the invention selected for purposed of illustration only, is shown in the accompanying drawings in which:

FIG. 1 is a side view of a two-component dispensing device, consisting of a twin-barrelled dispensing cartridge and a static mixer unit, shown partly in section;

FIG. 2 is a view of the cartridge of FIG. 1 as seen from the side of the orifice; and FIG. 3 is an inlet end view of the mixer unit of FIG. 1.

*FIG. 4a is a view of a cartridge end for three fluids; and*

*FIG. 4b is a view of the inlet end of a mixer for three fluids.*

The illustrative embodiment of the invention herein described comprises a dispensing device 1 shown in FIG. 1 employing two cylindrical parallel barrels 2, each having a delivery plunger or piston 3 for the delivery of the cartridge contents. From the storage chamber in each barrel 2 a dispensing channel 5 communicates with a common orifice 6 of the cartridge, the two channels being separated up to and within the orifice by a baffle 4 the downstream end of whichis in the form of a line extending radially across the orifice 6 which is surrounded by a base plate 7 for detachably and fittingly mounting a static mixer unit 10 comprising a mixing tube 11 to the orifice. Said base plate 7 is provided with two juxtapositioned claws 8 for mounting the mixer unit 10 in the manner of a bayonet or quarter-turn fastener. This makes it possible for the mixing tube 11 to be releasably attached to and sealed around the orifice 6 which is provided with a flange 12 for this purpose. In connecting the mixer unit to the cartridge, the flange is put against the socket plate 7 between the claws 8 in a rotary position 90° offset from that in FIG. 3, and then rotated by a quarter turn whereby the flange grips under the claws 8. By means of two stops 13 provided on the flange 12, abutting against claws 8, the rotary position of the connected mixer unit 10 is fixed in relation to the baffle.

Within the tube 11 of the static mixer unit 10 are stacked longitudinally in succession, as known per se, a plurality of stationary mixing vanes 14, 16 with alternating right-hand and left-hand twist and fixed in the tube alternately at right angles. In the present mixer design, all of the mixing elements 14, 16 are preferably formed in a single molding so as to form a mixing element assembly and they are fixed as a single unit in the tube 1. A subdivision into two or more sectional elements is, however, possible.

The first element 14 can be a ribbon-like separator having a transverse, radially disposed end corresponding to that of the downstream end of the baffle 4. Whatever its form is, it is placed in the inlet end of the tube 11, with its upstream end in tight [abuttment] *abutment* with the end of the baffle 4. This separator 14 may be contoured as one of the mixing elements, or it can merely serve to maintain the integrity and separation of the two streams with varying degrees of twist to flat.

It is necessary that the first element 14 (i.e. the separation means) of the mixer unit be fixed relative to the mixing tube 11 such that its inlet edge 15, after connecting the mixer unit 10 to the twin cartridge 1, as described before, is oriented parallel to and in [abuttment] *abutment* with the downstream end of baffle 4 in the orifice.

Accordingly the separation means 14 continues a substantial distance into the mixing tube 11 beyond the interface 20 (delivery point) between the end of the orifice and the first point at which the two, usually reactive, fluids actually contact each other. This distance is selected to ensure that, even during lengthy idle periods after dispensing has begun, no reaction or hardening of the cartridge content can occur either at the delivery point 20 of the orifice or by diffusion back into the cartridge. The term herein "substantial distance" is intended to mean such a dimension.

The necessary relative position of the separator 14 (and, consequently, of the following vanes 16) within the mixing tube 11 may be achieved preferably by means of a tight fit, i.e. by matching the diameters of the vanes and the bore of the tube. In the embodiment shown, however, the separator 14 is somewhat extended at its inlet edge 15 in the direction of the tube diameter, the extensions resting in corresponding notches 17 provided in the tube wall (FIG. 3). By this means, axial pressure is provided between the inlet edge 15 and the downstream end of baffle 4 to ensure tight connection. The inlet end 15 may preferably be formed with a bevel. If all the elements 14, 16 are formed, as usual, as as a single piece including both right and left mixing elements (of molded plastic), it is possible to fix the mixing elements as a united assembly in the tube 11 at its exit end 18 axially and in rotary position with respect to the tube 11 (e.g. as known per se, by means of cam-like guides at the innerside of the tube) in order to ensure the correct connection of the inlet edge 15; by suitably dimensioning of the lengths of the mixing element assembly and the tube, [in that case,] the inlet edge 15 may be urged with residual spring compression against the end of baffle 4 by slightly compressing the mixing element assembly axially when joining the mixer unit 10 with the cartridge 1.

Having now described a prefered embodiment of the invention, it will now be obvious to those skilled in the art that modifications and adaptations thereof can be made without departing from the spirit of the invention. Thus, it is not necessary that it be limited to the dispensing of two fluids inasmuch as additional fluids can be delivered simultaneously. In this case, the separator ribbon element 14 needs only to keep the fluids separated. This can be accomplished by forming it radially outwardly from the axis of the tube, with as many vane portions as there are fluids. *FIGS. 4a and 4b illustrate an embodiment for mixing three fluids, 4' being the baffle in the cartridge portion and 15' being the separator in the mixing tube.* Further modifications will be apparent to those skilled in the art and therefore it is not our intention to limit the invention to the precise form shown in the drawings by rather to limit it only in the terms of the appended claims.

We claim:

1. In a device for the simultaneous delivery of a plurality of separate fluids to a dispensing point downstream of which the fluids are to be admixed, the combination comprising:

a delivery orifice for said device for delivering said fluids to said [delivery] *dispensing* point;

a baffle in said orifice for separating said fluids upstream of said [delivery] *dispensing* point having a transverse radially extending downstream end;

a mixing tube having an inlet [and] *end*, an outlet end *and a central longitudinal axis*; a plurality of each of first and second stationary mixing elements in said tube;

said mixing elements substantially in the form of twisted ribbons spanning the interior diameter of said mixing tube and having transverse radially extending entrance and exit ends;

said mixing elements further comprising means for directing the how of said fluids in helical paths around the axis of said tube said first elements directing it in one direction and said second elements directing it in the opposite direction;

means for fixing said elements in said tube with the first and second elements alternating along the axis of said tube and with the entrance of each downstream element set at approximately right angles to the exit end of the next element upstream thereof;

means at the inlet end of said tube for releasably securing said tube to said orifice circumferentially sealing said orifice, *said means comprising a pair of opposing flanges arranged on a first diameter of said inlet end of said mixing tube*;

means for preventing cross contamination of the fluids comprising ribbon-like separation means affixed to said tube in the inlet end of said tube having a transverse, radially extending inlet end in [abuttment] *abutment* with and sealing the downstream end of said baffle when said tube is secured to said orifice for maintaining the separation and integrity of said fluids each to itself for a substantial distance within said mixing tube downstream of the downstream end of said baffle, *said separation means being positioned on a second diameter of said inlet end of said mixing tube, said second diameter being approximately perpendicular to said first diameter*; and means in said tube for holding said separation means in [abuttment] *abutment* with and at right angles to the entrance end of the next element downstream.

2. The combination defined in claim 1 further characterized by:

means for subjecting the upstream end of the separation means to substantial residual spring pressure against the downstream end of said baffle when the tube is secured to said dispensing device.

3. The combination defined in claim 1 further characterized by:

said separation means in the inlet end of said mixing tube arranged to direct the fluids in a helical path, and the stationary mixing element immediately downstream of said separation set at right angles to said separation means and directing the fluids in an oppositely rotating helical path.

4. The combination defined in claim 3 further characterized by:

said separation means in the form of one of said mixing elements for optimal preparation of the flow paths of said fluids for subsequent mixing.

5. The combination defined in claim 1 further characterized by:

said dispenser being adapted for dispensing only two fluids.

[6. The combination defined in claim 1 further characterized by;

both said baffle and said separator means adapted to meaintain the separation of a multiplicity greater than two of fluids.]

*7. In a device for the supply and mixing of a plurality of separate fluids, said device having storage compartments for such separate fluids which are supplied to a delivery orifice, a baffle, having a transverse end, extending in said orifice for maintaining separation of fluids and a mixing tube removably affixed to said orifice by a pair of opposing flanges on said mixing tube, said flanges being positioned on a first diameter of the mixing tube and having a plurality of stationary mixing elements for supplying a mix of said fluids to a dispensing point, the improvement comprising:*

*separation means in said mixing tube arranged on a second diameter of the mixing tube for preventing cross-contamination of said fluids disposed at an inlet end of said tube in abutment with and sealing the transverse end of said baffle for maintaining the separation and integrity of said fluids for a substantial distance within said mixing tube from the end of said baffle so that admixing of said fluids at said delivery orifice is prevented, wherein said first diameter of the mixing tube is approximately perpendicular to said second diameter of the mixing tube.*

*8. The device of claim 7 wherein said separation means comprises a portion of the stationary mixing elements.*

*9. The device of claim 7, including means to align the separation means with the transverse end of the baffle.*

*10. The device of claim 7 including means to force the separation means against the transverse end of the baffle by sprint pressure.*

*11. The device of claim 7 wherein said static mixing elements and said separation means each comprise means for directing the flow of fluids in helical paths around the axis of the mixing tube.*

*12. The device in accordance with claim 11 wherein said static mixing elements include first and second elements which are substantially in the form of twisted ribbons, said first and second elements alternating in direction, said separation means also being in the form of a twisted ribbon and being the first element in a series of alternating first and second elements.*

*13. In a static mixing tube having an inlet for receiving a plurality of separate fluids, static mixing means for mixing said fluids, an outlet for dispensing a fluid mixture, and means for mounting said mixing tube to a store of separate fluids including a pair of opposing flanges arranged on a first diameter of said inlet of said mixing tube, the store of separate fluids having supply means with a separating baffle positioned therein to prevent mixing of said plurality of separate fluids, the improvement comprising:*

*separation means fixed within said mixing tube between said inlet and said static mixing means, said separation means being positioned on a second diameter of said inlet of said mixing tube, said second diameter being approximately perpendicular to said first diameter, said separation means for being positioned external to said supply means and for continuing to prevent mixing of said plurality of separate fluids after said plurality of fluids pass from said supply means into said mixing tube.*

*14. The mixing tube of claim 13 wherein said separation means comprises a portion of the static mixing means.*

*15. The mixing tube of claim 13 including means to align the separation means with the transverse end of the baffle.*

*16. The mixing tube of claim 13 comprising means to force the separation means against the transverse end of the baffle by spring pressure.*

*17. The mixing tube of claim 13 wherein the static mixing means and said separation means each comprise means for directing the flow of fluids in helical paths around the axis of the mixing tube.*

*18. The mixing tube in accordance with claim 13 wherein the static mixing means include first and second elements which are substantially in the form of twisted ribbons, said first and second elements alternating in direction, said separation means also being in the form of a twisted ribbon and being the first element in a series of alternating first and second elements.*

*19. In a static mixing tube having an inlet for receiving a plurality of separate fluids, static mixing means for mixing said fluids, an outlet for dispensing a fluid mixture, and means for mounting said mixing tube to a store of seperate fluids including a pair of opposing flanges arranged relative to a first diameter of said inlet of said mixing tube, the store of separate fluids having supply means with a separating baffle positioned therein to prevent mixing of said plurality of seperate fluids, the improvement comprising:*

*separation means fixed within said mixing tube between said inlet and said static mixing means, said separation means being positioned relative to a second dismeter of said inlet of said mixing tube, said second diameter being approximately perpendicular to said first*

*diameter, said sepration means for being positioned external to said supply means and for continuing to prevent mixing of said plurality of seperate fluids after said plurality of fluids pass from said supply means into said mixing tube.*

*20. The mixing tube of claim 19 wherein said separation means comprises a portion of the static mixing means.*

*21. The mixing tube of claim 19 including means to align the separation means with the transverse end of the baffle.*

*22. The mixing tube of claim 19 comprising means to force the separation means against the transverse end of the baffle by spring pressure.*

*23. The mixing tube of claim 19 wherein the static mixing means and said separation means each comprise means for directing the flow of fluids in helical paths.*

*24. The mixing tube in accordance with claim 19 wherein the static mixing means include first and second elements which are substantially in the form of twisted ribbons, said first and second elements alternating in direction, said separation means also being in the form of a twisted ribbon and being the first element in a series of alternating first and second elements.*

*25. The mixing tube of claim 19 wherein said separation means is adapted to maintain the separation of a multiplicity greater than two of fluids.*

*26. In a device for the simultaneous delivery of a plurality of separate fluids to a delivery point downstream of which the fluids are to be admixed, the combination comprising:*

*a delivery orifice for said device for delivering said fluids to said delivery point;*

*a baffle in said orifice for separating said fluids upstream of said delivery point having a transverse radially extending downstream end;*

*a mixing tube having an inlet end, an outlet end and a central longitudinal axis; a plurality of each of first and second stationary mixing elements in said tube;*

*said mixing elements substantially in the form of twisted ribbons spanning the interior diameter of said mixing tube and having transverse radially extending entrance and exit ends;*

*said mixing elements further comprising means for directing the flow of said fluids in helical paths around the axis of said tube, said first elements directing it in one direction and said second elements directing it in the opposite direction;*

*means for fixing said elements in said tube with the first and second elements alternating along the axis of said tube and with the entrance of each downstream element set at approximately right angles to the exit end of the next element upstream thereof;*

*means at the inlet end of said tube for releasably securing said tube to said orifice circumferentially sealing said orifice, said means comprising a pair of opposing flanges arranged relative to a first diameter of said inlet end of said mixing tube;*

*means for preventing cross contamination of the fluids comprising ribbon-like separation means affixed to said tube in the inlet end of said tube having a transverse, radially extending inlet end in abutment with and sealing the downstream end of said baffle when said tube is secured to said orifice for maintaining the separation and integrity of said fluids each to itself for a substantial distance within said mixing tube downstream of the downstream end of said baffle, said separation means being positioned relative to a second diameter of said inlet end of said mixing tube, said second diameter being approximately perpendicular to said first diameter; and*

*means in said tube for holding said separation means in abutment with and at right angles to the entrance end of the next element downstream.*

* * * * *